United States Patent
Hasegawa

(10) Patent No.: US 10,395,228 B2
(45) Date of Patent: Aug. 27, 2019

(54) DEVICE CONNECTION SYSTEM, PORTABLE TERMINAL, DEVICE CONNECTION METHOD, AND DEVICE CONNECTION PROGRAM

(71) Applicant: NEC Platforms, Ltd., Kawasaki-shi, Kanagawa (JP)

(72) Inventor: Keiji Hasegawa, Kawasaki (JP)

(73) Assignee: NEC PLATFORMS, LTD, Kanagawa (JP)

( * ) Notice: Subject to any disclaimer, the term of this patent is extended or adjusted under 35 U.S.C. 154(b) by 81 days.

(21) Appl. No.: 14/441,231

(22) PCT Filed: Feb. 25, 2014

(86) PCT No.: PCT/JP2014/054424
§ 371 (c)(1),
(2) Date: May 7, 2015

(87) PCT Pub. No.: WO2014/141865
PCT Pub. Date: Sep. 18, 2014

(65) Prior Publication Data
US 2015/0287010 A1    Oct. 8, 2015

(30) Foreign Application Priority Data
Mar. 13, 2013   (JP) .................................. 2013-050579

(51) Int. Cl.
*G06Q 20/00* (2012.01)
*G06Q 20/20* (2012.01)
(Continued)

(52) U.S. Cl.
CPC ........... *G06Q 20/202* (2013.01); *G06Q 20/20* (2013.01); *H04W 4/043* (2013.01); *H04W 84/12* (2013.01)

(58) Field of Classification Search
CPC ...... G06Q 20/20; G06Q 20/202; H04M 3/422
(Continued)

(56) References Cited

U.S. PATENT DOCUMENTS 7,203,728 B2   4/2007 Lum
2004/0122738 A1*  6/2004 Lum .................... G06Q 20/202
                                                    705/21

(Continued)

FOREIGN PATENT DOCUMENTS

CN        1756218 A       4/2006
JP      2004-247794 A     9/2004
(Continued)

OTHER PUBLICATIONS

International Search Report for PCT Application No. PCT/JP2014/054424, dated Apr. 22, 2014.
(Continued)

*Primary Examiner* — Rokib Masud

(57) ABSTRACT

The purpose of the present invention is to enable nearby devices to be automatically identified if a portable terminal moves, and to automatically connect the identified devices and the portable terminal by a relatively stable high-speed communication format such as wireless LAN. In the present invention, in a system in which a first device and a second device are associated with each other and handled as a set and in which a plurality of such sets are disposed at locations distant from each other, a portable terminal that is used in the system performs communication with one of the first devices in compliance with a first communication format that is a short-distance wireless communication format, and so as to specify a set which includes said one of the first devices located closer to the portable terminal than other first devices, and performs communication with a second device included in the identified set in compliance with a second communication format.

11 Claims, 10 Drawing Sheets

(51) Int. Cl.
*H04W 4/04* (2009.01)
*H04W 84/12* (2009.01)

(58) Field of Classification Search
USPC ...................................... 705/16, 21
See application file for complete search history.

(56) References Cited

U.S. PATENT DOCUMENTS

| | | | |
|---|---|---|---|
| 2004/0157559 A1 | 8/2004 | Sugikawa | |
| 2004/0228465 A1* | 11/2004 | Schwank | H04M 3/4228 379/219 |
| 2005/0261981 A1* | 11/2005 | Girdler | G06Q 20/20 705/16 |
| 2006/0116147 A1 | 6/2006 | Hashizume | |
| 2006/0229884 A1* | 10/2006 | Grundhoff | G06Q 10/0833 705/333 |

FOREIGN PATENT DOCUMENTS

| | | |
|---|---|---|
| JP | 2005-258759 A | 9/2005 |
| JP | 2006-101293 A | 4/2006 |
| JP | 2006-115377 A | 4/2006 |
| JP | 2006-195765 A | 7/2006 |
| JP | 2006-243907 A | 9/2016 |

OTHER PUBLICATIONS

Chinese Office Action for CN Application No. 201480003067.9 dated Dec. 2, 2016 with English Translation.
Japanese Office Action for JP Application No. 2013-050579 dated Apr. 11, 2014 with English Translation.

* cited by examiner

701: POS Peripheral Device Registration Information

| Set Name: First Set | |
|---|---|
| Device Name | Information for Specifying Device |
| First Barcode Hand Scanner | (Identification Information) |
| First Printer | (IP address) |
| First Cash Drawer | (IP address) |

| Set Name: Second Set | |
|---|---|
| Device Name | Information for Specifying Device |
| Second Barcode Hand Scanner | (Identification Information) |
| Second Printer | (IP address) |
| Second Cash Drawer | (IP address) |

| Set Name: Third Set | |
|---|---|
| Device Name | Information for Specifying Device |
| Third Barcode Hand Scanner | (Identification Information) |
| Third Printer | (IP address) |
| Third Cash Drawer | (IP address) |

FIG.3

702: Self-Identification Information

| Device Name | Information for Specifying Device (Identification Information) |
|---|---|
| First Barcode Hand Scanner | |

703: Set-Identification Information

| Device Name | Name of Set to which Device Belongs (First Set) |
|---|---|
| First Barcode Hand Scanner | |

FIG.5

704: POS Peripheral Device Registration Information

| Set Name: First Set | |
|---|---|
| Device Name | Information for Specifying Device |
| First Communication Device | (Identification Information) |
| First Barcode Scanner | (IP address) |
| First Printer | (IP address) |
| First Cash Drawer | (IP address) |

| Set Name: Second Set | |
|---|---|
| Device Name | Information for Specifying Device |
| Second Communication Device | (Identification Information) |
| Second Barcode Scanner | (IP address) |
| Second Printer | (IP address) |
| Second Cash Drawer | (IP address) |

| Set Name: Third Set | |
|---|---|
| Device Name | Information for Specifying Device |
| Third Communication Device | (Identification Information) |
| Third Barcode Scanner | (IP address) |
| Third Printer | (IP address) |
| Third Cash Drawer | (IP address) |

FIG.8

705: Self-Identification Information

| Device Name | Information for Specifying Device |
|---|---|
| First Communication Device | (Identification Information) |

706: Set-Identification Information

| Device Name | Name of Set to which Device Belongs |
|---|---|
| First Communication Device | (First Set) |

FIG.9

707: Belonging Device Registration Information

| Device Name | Information for Specifying Device |
|---|---|
| First Printer | (IP address) |
| First Cash Drawer | (IP address) |

708: Belonging Device Registration Information

| Device Name | Information for Specifying Device |
|---|---|
| First Barcode Scanner | (IP address) |
| First Printer | (IP address) |
| First Cash Drawer | (IP address) |

FIG.10

DEVICE CONNECTION SYSTEM, PORTABLE TERMINAL, DEVICE CONNECTION METHOD, AND DEVICE CONNECTION PROGRAM

This application is a National Stage Entry of PCT/JP2014/054424 filed on Feb. 25, 2014, which claims priority from Japanese Patent Application 2013-050579 filed on Mar. 13, 2013, the contents of all of which are incorporated herein by reference, in their entirety.

TECHNICAL FIELD

The present invention relates to a device connection system, a portable terminal, a device connection method, and a device connection program for connecting to a device in a system.

BACKGROUND ART

In retail shops, restaurants and so forth, more users consider about introduction of a POS (point of sales) system utilizing a tablet terminal. Here, as the POS system utilizing a tablet terminal, popular is a system where POS a peripheral device such as a printer, a barcode hand scanner and a cash drawer and the tablet terminal are utilized by being wire-connected physically each other via a cradle or a cable in compliance with USB (Universal Serial Bus) format and so forth.

In this respect, as a characteristic of the tablet terminal, there is a point that the tablet terminal has superior portability and is available even in a state to be held in hand. Therefore, also in the POS system utilizing the tablet terminal, if it is possible to operate the tablet terminal in hand, usability is improved further.

However, although the tablet terminal is available while moving within a shop, the POS peripheral device is arranged at a fixed location. Further, when controlling the POS peripheral device from the tablet terminal, it is demanded to identify and connect to a nearby POS peripheral device.

Namely, for carrying the tablet terminal and connecting to the nearby POS peripheral device, it is necessary that a user of the tablet terminal selects the nearby POS peripheral devices which is a connection destination and changes the connection destination one by one. However, in a case where the POS peripheral device is connected to the tablet terminal via wireless LAN (Local Area Network), it is impossible to specify which POS peripheral device is the closest to the tablet terminal, because the POS peripheral device is specified with an IP address.

In consideration of this condition, for example, an art disclosed in PTL 1 is proposed. In the art disclosed in PTL 1, a positioning system represented by GPS (Global Positioning System) is utilized. Specifically, the present position of a terminal carried by a user is measured by GPS, and the measured result is notified to a server. The server receiving the notification specifies a device (printer) closer to the terminal carried by the user on the basis of the measured result of GPS. Further, the server notifies a name and location of the printer as a specified result. The user refers to the notified result at the terminal and can select and utilize the closest printer by using the reference contents.

CITATION LIST

Patent Literature

{PTL 1} Japanese Patent Application Publication No. 2006-195765

SUMMARY OF INVENTION

Technical Problem

By utilizing the art and so forth disclosed in PTL 1 as above, it becomes possible to select a device on the basis of not an IP address but a printer name and so forth. Further, it becomes possible to grasp a selectable device on the basis of a location information.

However, even if general arts such as the art disclosed in PTL 1 are used, finally it is necessary for a user to select a nearby device, and therefore, this is intricate for the user. Further, in a case where GPS is utilized for position measurement as disclosed in PTL 1 and so forth, only wide area position specification is possible and position specification per a few meters which is required when switching devices in a shop is difficult. Further, especially indoors, there is a case where a signal from a GPS satellite cannot be received adequately, and this case is a problem also.

For solving these problems, it is also considered to mount a short-distance wireless communication function such as Bluetooth (registered trademark) on a POS peripheral device and connect the POS peripheral device and the tablet terminal via the short-distance wireless communication. This is because only short-distance connection is possible in the short-distance wireless communication contrary to wireless LAN, and it becomes possible to connect only to a nearby device.

However, in the short-distance wireless communication such as Bluetooth (registered trademark), there is a problem that it is more difficult to perform stable high speed communication than in the wireless LAN. Further, in the short-distance wireless communication, data transfer quantity per time is less than in the wireless LAN. Therefore, the short-distance wireless communication is inadequate for a connection method for a device such as a POS printer where a large volume of data communication is necessary.

Therefore, the purpose of the present invention is to provide a device connection system, a portable terminal, a device connection method, and a device connection program which enable a nearby device to be automatically identified if a portable terminal moves, and to automatically connect the identified device and the portable terminal by a relatively stable high-speed communication format such as wireless LAN.

Solution to Problem

According to a first aspect of the present invention, there is provided a portable terminal used in a system in which a first device and a second device are handled as a set by being associated with each other and in which a plurality of such sets are disposed at locations distant from each other, wherein: the portable terminal performs communication with one of the first devices in compliance with a first communication format that is a short-distance wireless communication format, so as to specify a set which includes said one of the first devices located closer to the portable terminal than other first devices, and performs communication with a second device included in the specified set in compliance with a second communication format.

According to a second aspect of the present invention, there is provided a device connection method performed by a portable terminal used in a system in which a first device and a second device are handled as a set by being associated with each other and in which a plurality of such sets are disposed at locations distant from each other, comprising: performing communication with one of the first devices in compliance with a first communication format that is a short-distance wireless communication format, so as to specify a set which includes said one of the first devices located closer to the portable terminal than other first devices, and performing communication with a second device included in the specified set in compliance with a second communication format.

According to a third aspect of the present invention, there is provided a device connection program for causing a computer to function as a portable terminal used in a system in which a first device and a second device are handled as a set by being associated with each other and in which a plurality of such sets are disposed at locations distant from each other, the program causing the computer to function as: the portable terminal which performs communication with one of the first devices in compliance with a first communication format that is a short-distance wireless communication format, and so as to specify a set which includes said one of the first devices located closer to the portable terminal than other first devices, and performs communication with a second device included in the identified set in compliance with a second communication format.

According to a fourth aspect of the present invention, there is provided a device connection system which comprises a first device, a second device and a portable terminal, in which the first device and the second device are handled as a set by being associated with each other and in which a plurality of such sets are disposed at locations distant from each other, wherein the portable terminal performs communication with one of the first devices in compliance with a first communication format that is a short-distance wireless communication format, so as to specify a set which includes said one of the first devices located closer to the portable terminal than other first devices, and performs communication with a second device included in the specified set in compliance with a second communication format, and the portable terminal, the first device and the second device, or the portable terminal and the second device are devices which execute functions of a POS, namely Point of Sales, system, and the portable terminal and the device which executes functions of the POS system included in one set communicate with each other, so as to execute at least a part of functions as the POS system.

According to a fifth aspect of the present invention, there is provided a device connection method performed by a system which comprises a first device, a second device and a portable terminal, in which the first device and the second device are handled as a set by being associated with each other and in which a plurality of such sets are disposed at locations distant from each other, wherein the portable terminal performs communication with one of the first devices in compliance with a first communication format that is a short-distance wireless communication format, so as to specify a set which includes said one of the first devices located closer to the portable terminal than other first devices, and performs communication with a second device included in the specified set in compliance with a second communication format, and the portable terminal, the first device and the second device, or the portable terminal and the second device are devices which execute functions of a POS, namely Point of Sales, system, and the portable terminal and the device which executes functions of the POS system included in one set communicate with each other, so as to execute at least a part of functions as the POS system.

Advantageous Effects of the Invention

According to the present invention, it becomes possible to enable a nearby device to be automatically identified if a portable terminal moves, and to automatically connect the identified device and the portable terminal by a relatively stable high-speed communication format such as wireless LAN.

BRIEF DESCRIPTION OF DRAWINGS

FIG. 3 A table illustrates one example of POS peripheral device registration information according to an embodiment of the present invention.

FIG. 5 A table illustrates one example of self-identification information and set-identification information according to an embodiment of the present invention.

FIG. 8 A table illustrates one example of POS peripheral device registration information according to an embodiment of the present invention.

FIG. 9 A table illustrates one example of self-identification information and set-identification information according to an embodiment of the present information.

FIG. 10 A table illustrates one example of belonging device registration information.

DESCRIPTION OF EMBODIMENTS

Next, an embodiment of the present invention will be described in detail with reference to the figures.

Here, in below explanation, "short-distance wireless communication" includes all of short-distance wireless communication by radio waves in compliance with a standard such as Bluetooth (registered trademark) and short-distance wireless communication by infrared ray in compliance with a standard such as IrDA (Infrared Data Association).

On the other hand, communication utilizing LAN constructed in compliance with a standard such as Ethernet (registered trademark) is referred to as "LAN communication".

Then, in this embodiment, when POS peripheral devices are connected to a tablet terminal, by combining a device which is connected to via LAN communication and a device which is connected to via short-distance wireless communication, there is provided a method to detect the closest device among a plurality of devices which are connected to via LAN communication, the location of the closest device having been impossible to be specified so far.

Figure 1:
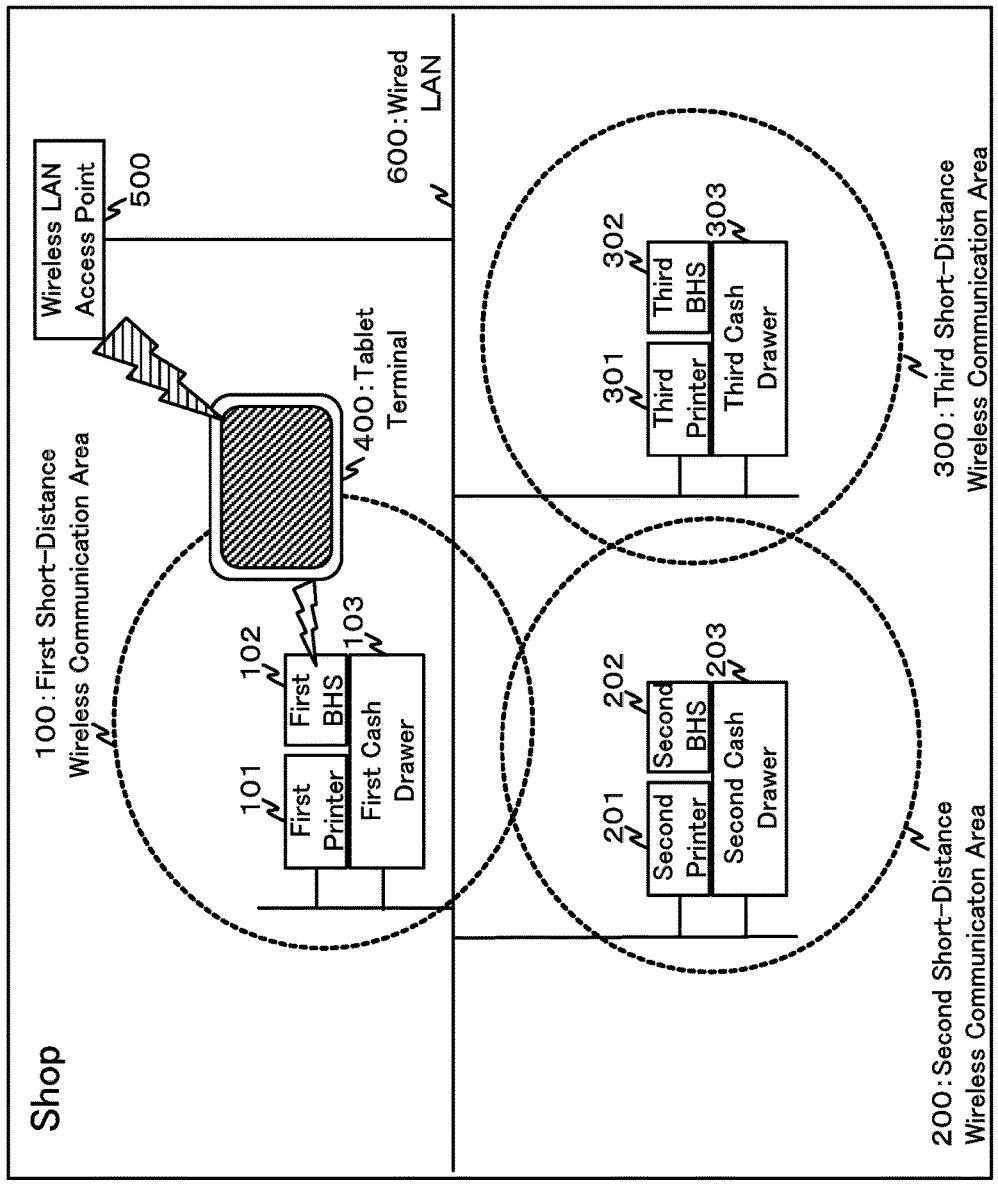
FIG. 1 A block diagram illustrates a basic configuration of whole of a first embodiment of the present invention.

FIG. 1 is a figure which illustrates whole of a POS system being a first embodiment. Referring to FIG. 1, the POS system being this embodiment includes a first printer 101, a first barcode hand scanner 102, a first cash drawer 103, a second printer 201, a second barcode hand scanner 202, a second cash drawer 203, a third printer 301, a third barcode hand scanner 302, a third cash drawer 303, a tablet terminal 400, a wireless LAN access point 500 and wired LAN 600. Meanwhile, in the figure, the barcode hand scanners are described as "BHS".

Here, these instruments included in this embodiment are supposed as located in a shop such as a retail shop. Further, in this embodiment, a set of a barcode hand scanner, a cash drawer and a printer is located as one set of POS peripheral devices.

For example, as a first set of POS peripheral devices, a first printer 101, a first barcode hand scanner 102 and a first cash drawer 103 are located. Then, in this embodiment, three sets of these POS peripheral devices are installed. However, the configuration shown in FIG. 1 is merely one example, and range of application of this embodiment is not limited to three sets and may be equal to or more than two sets In this embodiment, a set of these POS peripheral devices and the tablet terminal 400 cooperate with each other, thereby function as a POS register and POS.

Next, communication in this embodiment is explained.

In a retail shop where this embodiment is located, wireless LAN communication is possible by one wireless access point 500 or a plurality of wireless access points whose illustration is omitted. Further, wired LAN 600 is laid in the shop and communication by wired LAN is possible. Meanwhile, an apparatus being wired-connected to wired LAN and an apparatus being wireless-connected to wireless LAN can communicate with each other.

Then, the first barcode hand scanner 102, the second barcode hand scanner 202 and the third barcode hand scanner 302 (hereinafter referred to as "respective barcode hand scanner" in a case where there is no limitation to any of these three barcode hand scanners) can perform short-distance wireless communication. Here, a first short-distance wireless communication area 100 in FIG. 1 illustrates an area where the first barcode hand scanner 102 can perform short-distance wireless communication. Namely, the first barcode hand scanner 102 can perform short-distance wireless communication with the tablet terminal 400 which stays within the first short-distance wireless communication area 100. Similarly, a second short-distance wireless communication area 200 in FIG. 1 illustrates an area where the second barcode hand scanner 202 can perform short-distance wireless communication. Further similarly, a third short-distance wireless communication area 300 in FIG. 1 illustrates an area where the third barcode hand scanner 302 can perform short-distance wireless communication. There is a case where these short-distance wireless communication areas cannot overlap each other at all while there is a case where part of the areas overlap with each other.

Also, the first printer 101, the second printer 201 and the third printer 301 (hereinafter referred to as "respective printer" in a case where there is no limitation to any of these three printers), and the first cash drawer 103, the second cash drawer 203 and the third cash drawer 303 (hereinafter referred to as "respective cash drawer" in a case where there is no limitation to any of these three cash drawers) can perform wired LAN communication by use of wired LAN 600.

Then, the tablet terminal 400 can perform both of wireless LAN communication and short-distance wireless communication.

Taken together, in this embodiment, communication between the tablet terminal 400 and a respective barcode hand scanner is performed by short-distance wireless communication. On the other hand, communication among the tablet terminal 400, a respective printer and a respective cash drawer is performed by combining wired and wireless LAN communications.

Figure 2:
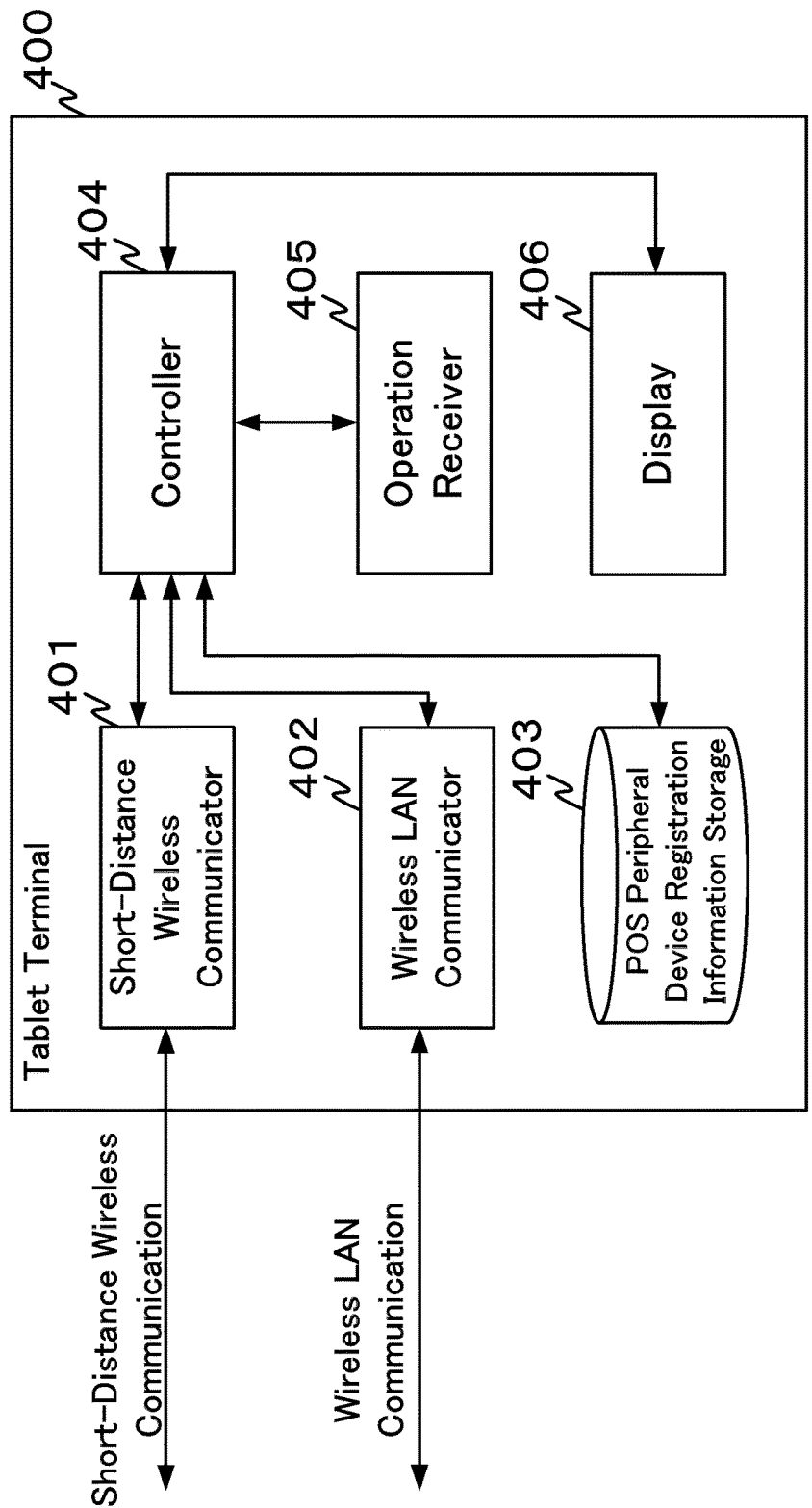
FIG. 2 A block diagram illustrates a basic configuration of a tablet terminal according to an embodiment of the present invention.

Next, functional blocks in the tablet terminal 400 are explained by referring to FIG. 2. Referring to FIG. 2, the tablet terminal 400 includes a short-distance wireless communicator 401, a wireless LAN communicator 402, a POS peripheral device registration information storage 403, a controller 404, an operation receiver 405 and a display 406.

The short-distance wireless communicator 401 includes a function for performing short-distance wireless communication. The wireless LAN communicator 402 includes a function for performing wireless LAN communication. The controller 404 performs communication with another apparatus using these communicators. Meanwhile, the controller 404 registers a respective barcode hand scanner beforehand for performing shot-distance wireless communication by use of the short-wireless communicator 401. Accordingly, the controller 404 puts the tablet terminal into the state that it is possible to start short-distance wireless communication, without a user's preliminary operation such as paring on each occasion. Of course, the user may perform a preliminary operation such as paring on each occasion, thereby puts the tablet terminal into the state that it is possible to start short-distance wireless communication.

The POS peripheral device registration information storage 403 is a storage which stores POS peripheral device registration information 701 being information particular to this embodiment and a shop's installation information. Referring to FIG. 3, the POS peripheral device registration information 701 in this embodiment includes information about three sets of POS peripheral devices.

Specifically, into a first set, information about the first printer 101, the first barcode hand scanner 102 and the first cash drawer 103 is stored as a set. Further, IP addresses which are information necessary for LAN communication with the first printer 101 and the first cash drawer 103 are linked to the first printer 101 and the first cash drawer 103. On the other hand, to the first barcode hand scanner 102, identification information for identifying the first barcode hand scanner 102 is linked. Meanwhile, as the identification information, it can be considered that an identification number particular to this embodiment is assigned. In another way, information such as a BD address (Bluetooth device address) which is assigned uniquely to each Bluetooth (registered trademark) corresponding apparatus for communication in compliance with Bluetooth (registered trademark) may be diverted as identification information.

Similarly, into a second set, information about the second printer 201, the second barcode hand scanner 202 and the second cash drawer 203 is registered as a set. Further similarly, into a third set, information about the third printer 301, the third barcode hand scanner 302 and the third cash drawer 303 is registered as a set. To a respective POS peripheral device, an IP address or an identification number is linked just like the first set.

This POS peripheral device registration information 701 is registered when installing the respective POS peripheral devices in the shop. The registration is achieved, for example, by the operation receiver 405 receiving a registration operation from a user.

The controller 404 is a controller which controls whole of the tablet terminal 400. The tablet terminal 400 achieves each of below actions on the basis of control from the controller 404. Further, the tablet terminal 400 cooperates with the respective POS peripheral device on the basis of control from the controller 404, thereby achieves functions as a POS system.

Meanwhile, the controller 404 is implemented by a processing unit such as CPU (Central Processing Unit) executing a process on the basis of a software particular to this embodiment and controlling each hardware in the tablet terminal 400.

The operation receiver 405 is a portion which receives operations from the user and the content of received operations is output to the controller 404.

Also, the display 406 is a portion which displays information to the user who utilizes the tablet terminal 400. Information which is generated and output by the controller 404 is displayed at the display 406.

Meanwhile, in this embodiment, the tablet terminal 400 is a tablet form terminal. Therefore, the operation receiver 405 and the display 406 are achieved by a touch panel.

Figure 4:
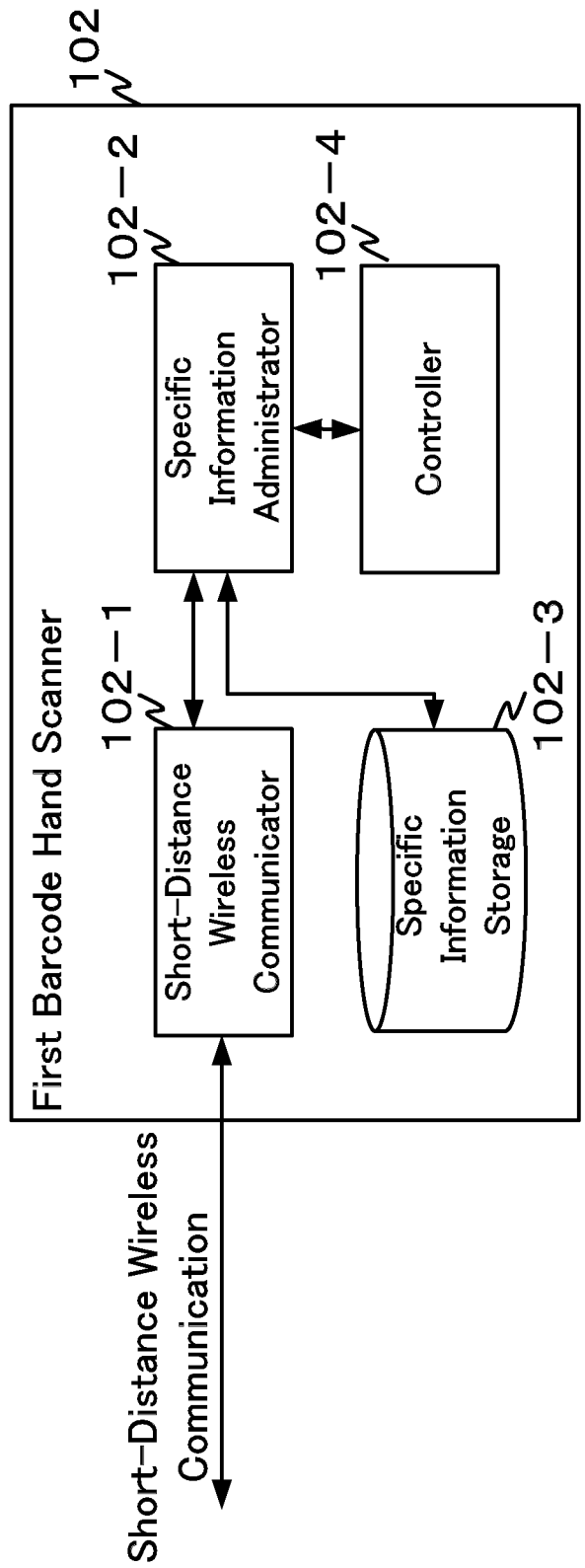
FIG. 4 A block diagram illustrates a basic configuration of a barcode hand scanner according to an embodiment of the present invention.

Next, referring to FIG. 4, functional blocks of a respective barcode hand scanner in this embodiment are explained. In FIG. 4, the explanation is performed by taking the first barcode hand scanner for example. Other barcode hand scanner, namely the second barcode hand scanner 202 and the third barcode hand scanner 302, are supposed to include functional blocks similar to functional blocks in the barcode hand scanner 102 also.

Referring to FIG. 4, the barcode hand scanner 102 includes a short-distance wireless communicator 102-1, a specific information administrator 102-2, a specific information storage 102-3 and a controller 102-4.

The short-distance wireless communicator 102-1 includes a function for performing short-distance wireless communication. The specific information administrator 102-2 utilizes the short-distance wireless communicator 102-1, and thereby performs communication with another apparatus.

The specific information administrator 102-2 is a portion to perform short-distance wireless communication with the tablet terminal 400 and notify information stored in the specific information storage 102-3 to the tablet terminal 400. Further, the specific information storage 102-3 is a portion which stores information particular to this embodiment. This information particular to this embodiment may be stored beforehand, for example, upon the product manufacture, or may be stored by the specific information administrator 102-2 on the basis of information transmitted from the tablet terminal 400. The controller 102-4 is a controller which controls whole of the barcode hand scanner 102. The barcode hand scanner 102 achieves each of below actions on the basis of control from the controller 102-4. Further, the barcode hand scanner 102 achieves a function as a barcode hand scanner on the basis of control from the controller 102-4. Meanwhile, the controller 102-4 may include the specific information administrator 102-2.

Here, information stored in the specific information storage 102-3 is explained by referring to FIG. 5.

Referring to FIG. 5, self-identification information 702 and set-identification information 703 are shown as information stored in the specific information storage 102-3.

Within the self-identification information 702, identification information for identifying the first barcode hand scanner 102 itself is stored. This identification information corresponds to identification information included in the POS peripheral device registration information 701 shown in FIG. 3. Namely, the same identification information is assigned to the same barcode hand scanner both in the POS peripheral device registration information 701 and the self-identification information 702.

Within the set identification information 703, a set name for identifying a set of POS peripheral devices to which the first barcode hand scanner 102 itself belongs is stored. This set name corresponds to a set name included in the POS peripheral device registration information 701 shown in FIG. 3. Namely, the same set name is assigned to the same set of POS peripheral devices both in the POS peripheral device registration information 701 and the self-identification information 702.

Meanwhile, although two information of the self-identification information 702 and the set-identification information 703 are shown in FIG. 5, it is sufficient that not both but either of these information is stored within the specific information storage 102-3. Specific utilization of these information is explained below.

Further, only portions which especially relate to this embodiments are illustrated in FIG. 4 as functional blocks of the first barcode hand scanner 102. Regarding the first barcode hand scanner 102, illustration of functional blocks for function as a barcode hand scanner, for example, a portion which reads a barcode, is omitted.

Further, configurations of the respective printer and the respective cash drawer can be achieved by a general purpose printer and a general purpose cash drawer and need not to be particular to this embodiment. Then, explanation of configurations of the general purpose printer and the general purpose cash drawer is omitted, because the configurations are well known to those skilled in the art.

Figure 6:
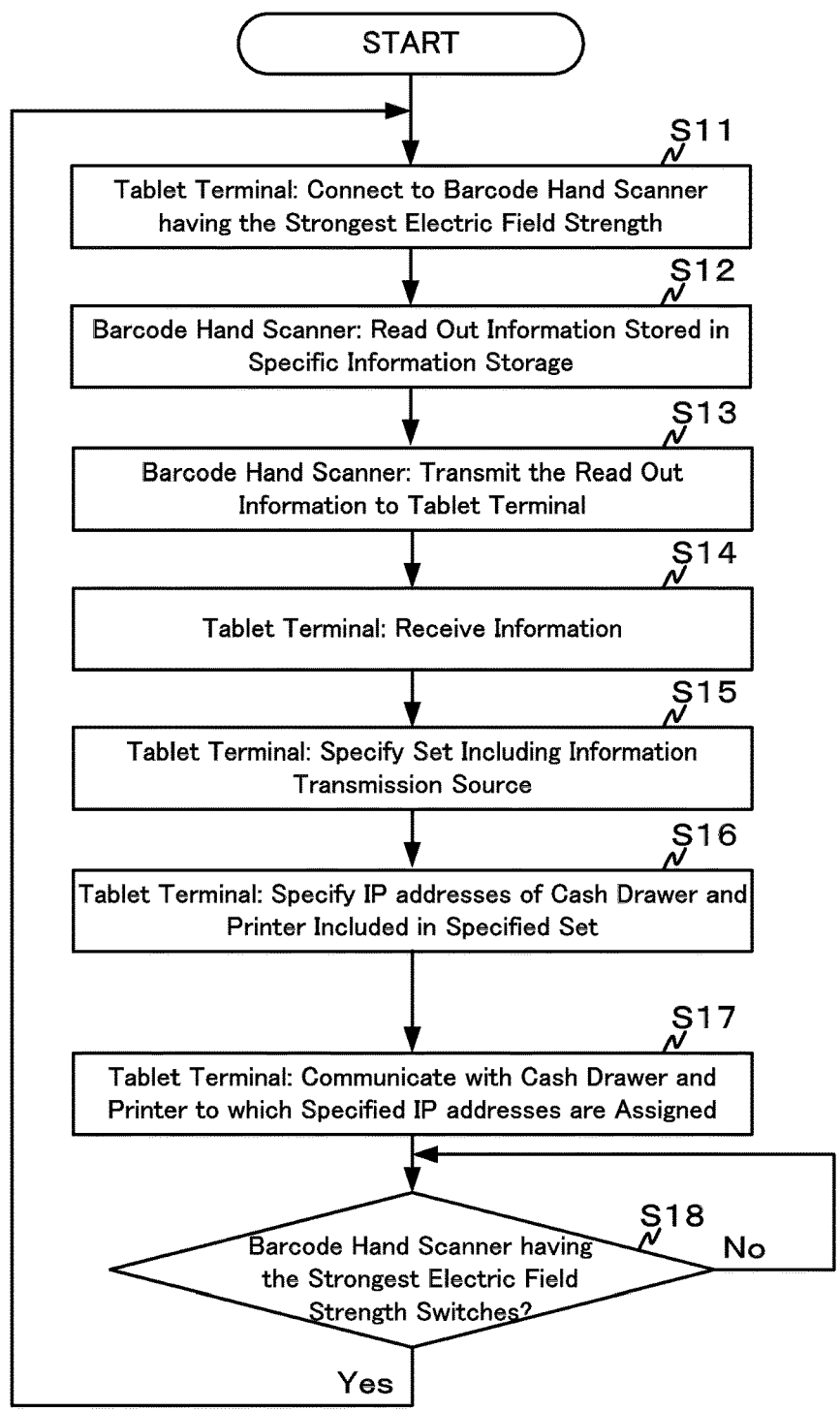
FIG. 6 A flowchart illustrates a basic action according to an embodiment of the present invention.

Subsequently, actions of this embodiment are explained referring to the flowchart in FIG. 6.

In this embodiment, when a user of the tablet terminal 400 uses the set of POS peripheral devices, the user moves to an area where the user can reach the set of POS peripheral devices. Therefore, usually, the user utilizes the POS peripheral devices and the tablet terminal 400 within the short-distance wireless communication area.

Then, the user utilizes the tablet terminal 400 while carrying the tablet terminal 400 and moving within the shop. Therefore, the tablet terminal 400 moves from a short-distance wireless communication area of any barcode hand scanner among the respective barcode hand scanners to another short-distance wireless communication area of another barcode hand scanner. At this time, the controller 404 of the tablet terminal 400 acquires an electric field strength of the short-distance wireless communication by use of the short-distance wireless communicator 401. Then, the tablet terminal 400 connects to the barcode hand scanner which has the strongest electric field strength via short-distance wireless communication (Step S11).

For example, the tablet terminal 400 which stays within the second short-distance wireless communication area 200 in FIG. 1 connects to the barcode hand scanner 202 which has the strongest electric field strength. Then, in a case where the tablet terminal 400 moves to the right side of the figure, the tablet terminal 400 becomes to stay within both of the second short-distance wireless communication area 200 and the third short-distance wireless communication area 300, furthermore, after that, becomes to stay within the third short-distance wireless communication area 300. In this case, at any timing of above movement, the barcode hand scanner which has the strongest electric field becomes the barcode hand scanner 302. Therefore, the tablet terminal 400 connects to the barcode hand scanner 302. Meanwhile, in a case where the short-distance wireless communication areas do not overlap, the short-distance wireless communication is disconnected once, and after that, the short-distance wireless communication becomes to be re-connected.

Here, in this embodiment, as the electric field strength, a received electric field strength (RSSI: Received Signal Strength Indication) is supposed. However, the respective barcode hand scanner may measure the received electric field strength and notify the received electric field strength to the tablet terminal 400, and the notified received electric field strength may be used. Furthermore, another standard such as a signal to noise ratio (SNR: Signal-to-Noise Ratio) may be used. Namely, in this embodiment, the purpose is to connect to a barcode hand scanner supposed to locate nearest to the tablet terminal 400. If this purpose is achieved, a standard other than the electric field strength may be used.

Meanwhile, if each set is installed in the state that the first short-distance wireless communication area 100, the second short-distance wireless communication area 200 and the third short-distance wireless communication area 300 do not overlap at all, it is impossible to communicate with a plurality of barcode hand scanners simultaneously. Namely, only a received electric field strength of a signal transmitted from one barcode hand scanner is measured. Therefore, it is sufficient to connect to a connectable barcode hand scanner without comparison as to the received electric field strengths in Step S11.

When the tablet terminal 400 establishes a connection to the barcode hand scanner (this explanation supposes the barcode hand scanner 102) via short-distance wireless communication, on the basis of information of the barcode hand scanner 102 during connection, it is specified which printer and which cash drawer exist near the tablet terminal 400 among a plurality of printers and cash drawers. This point is specifically explained as follows.

The specific information administrator 102-2 of the barcode hand scanner 102 which detects connection to the tablet terminal 400 reads out information stored in the specific information storage 102-3 (Step S12). This explanation supposes that the specific information administrator 102-2 reads out self-identification information 702.

Then, the specific information administrator 102-2 transmits the self-identification information 702 which has been read out to the tablet terminal 400 by use of the short-distance wireless communicator 102-1 (Step S13).

The controller 404 receives the self-identification information 702 by use of the short-distance wireless communicator 401 (Step S14).

Then, the controller 404 specifies a set including a transmission source of the self-identification information 702 by comparing the received self-identification information 702 and the POS peripheral device registration information 701 stored in the POS peripheral device registration information storage 403 (Step S15). In this example, the identification information of the first barcode hand scanner 102 is received as the self-identification information 702. Therefore, the first set to which the first barcode hand scanner 102 is included in the POS peripheral device registration information 701 is specified.

Next, the controller 404 specifies IP addresses of the cash drawer and the printer included in the set specified by referring to the POS peripheral device registration information 701 (Step S16). In this example, IP addresses of the first cash drawer 103 and the first printer 101 included in the specified first set are specified.

Then, the controller 404 communicates with the cash drawer and the printer to which the specified IP addresses are assigned by use of the wireless LAN communicator 402. In this example, the controller 404 communicates with the first cash drawer 103 and the first printer 101 (Step S17).

Thereafter, until a barcode hand scanner other than the barcode hand scanner 102 becomes the barcode hand scanner which has the strongest electric field strength (No in Step S18), regarding a printer and a cash drawer, the first cash drawer 103 and the first printer 101 are utilized.

On the other hand, in a case where the tablet terminal 400 moves and the barcode hand scanner which has the strongest electric field strength becomes a barcode hand scanner other than the barcode hand scanner 102 (Yes in Step S18), the connection to the printer and the cash drawer is disconnected and processes from Step S11 are repeated with a set including a new barcode hand scanner which has the strongest electric field as a target.

This embodiment as explained above brings an effect that the tablet terminal 400 can specify a nearby POS peripheral device automatically, because it is possible to acquire identification information from a nearby barcode hand scanner and specify a POS peripheral device on the basis of this identification information.

Further, this embodiment brings an effect that it becomes possible that a specified device and the tablet terminal 400 connect with each other automatically via wireless LAN being relatively stable high-speed communication format. This is because the tablet terminal 400 can automatically acquire an IP address of a POS peripheral device when the tablet terminal 400 specifies this POS peripheral device.

Additionally, it is possible to specify a nearby POS peripheral device in a shop and so forth with accuracy of a few meters. This is because the tablet terminal communicates to a nearby barcode hand scanner by use of short-distance wireless communication. Therefore, it is possible to specify a nearby POS peripheral device more certainly than PTL 1 utilizing GPS. Further, when specifying a nearby POS peripheral device on the basis of wireless LAN electric field strength, there is a case where change of the wireless LAN electric field strength due to an environment of an installation location, an installation direction of an access point and so forth is larger than due to a few meters distance. Therefore, on the basis of the wireless LAN electric field strength, there are some cases where a POS peripheral device which is not nearby is judged as a nearby POS peripheral device by mistake. However, in this embodiment, a plurality of wireless communication formats such as short-distance wireless communication and wireless LAN are used simultaneously, and therefore, it becomes possible to specify the closest POS peripheral device on the basis of the difference of communication available area.

Further, because the user of the tablet terminal 400 can utilize a nearby device without physical connection to the POS peripheral device to which the tablet terminal should connect or manual switching of the POS peripheral devices, it becomes possible to provide a smooth service.

Meanwhile, in above explanations, the self-identification information 702 is utilized in Steps S12 to S15.

Namely, the tablet terminal 400 communicates with the first barcode hand scanner 102 via short-distance wireless communication and specifies a set in the POS peripheral device registration information from the identification information of the first barcode hand scanner 102 included in the self-identification information 702. Then, the tablet terminal 400 specifies IP addresses of the first cash drawer 103 and the first printer 101 and communicates with the specified first cash drawer 103 and the specified first printer 101.

In this respect, it is also possible not to specify a set on the basis of identification information included in the self-identification information 702 but to give a set number to a set and specify the set on the basis of the set number sent from the barcode hand scanner. Namely, in Step S12, the set-identification information 703 stored in the specific information storage 102-3 is read out, and the tablet terminal 400 receives the set identification information 703 which has been read out (Steps S13 and S14). Then, by referring to the set-identification information 703, the controller 404 specifies a set including a transmission source of the set-identification information 703 (Step S15).

In this example, the first set can be specified. Therefore, it is sufficient that the specific information storage 102-3 of the barcode hand scanner stores not both but either of the self-identification information 702 and the set-identification information 703.

Further, although above embodiment is a preferred embodiment of the present invention, the scope of the present invention is not limited to the above embodiment. Embodiments in the form of variable modifications within a scope of the gist of the present invention are possible.

For example, although it is supposed that the respective cash drawer and the respective printer perform wired LAN communication in above embodiment, part of or all of respective cash drawers and respective printers may perform wireless LAN communication.

Further, the device which performs short-distance wireless communication with the tablet terminal 400 may be not the respective barcode hand scanner but another device. For example, the respective cash drawer may manage the self-identification information 702 and the set-identification information 703 and transmit the self-identification information 702 and the set-identification information 703 to the tablet terminal 400 via short-distance wireless communication.

Furthermore, not a barcode hand scanner which is utilized in hand but a fixed barcode scanner may be utilized.

Furthermore, although all of sets of POS peripheral devices are combinations of a barcode hand scanner, a cash drawer and a printer, it is not necessary that all sets are the same combination of devices. The set may include a device other than a cash drawer and a printer. Namely, it is enough that the set is a combination of devices which are necessary for processes performed at the installation location of the set of POS peripheral devices. Further, it is enough that the number of the POS peripheral devices other than apparatuses performing short-distance wireless communication is one at one installation location. Therefore, the set may be, for example, a combination of a cash drawer and a barcode hand scanner which performs short-distance wireless communication.

Figure 7:
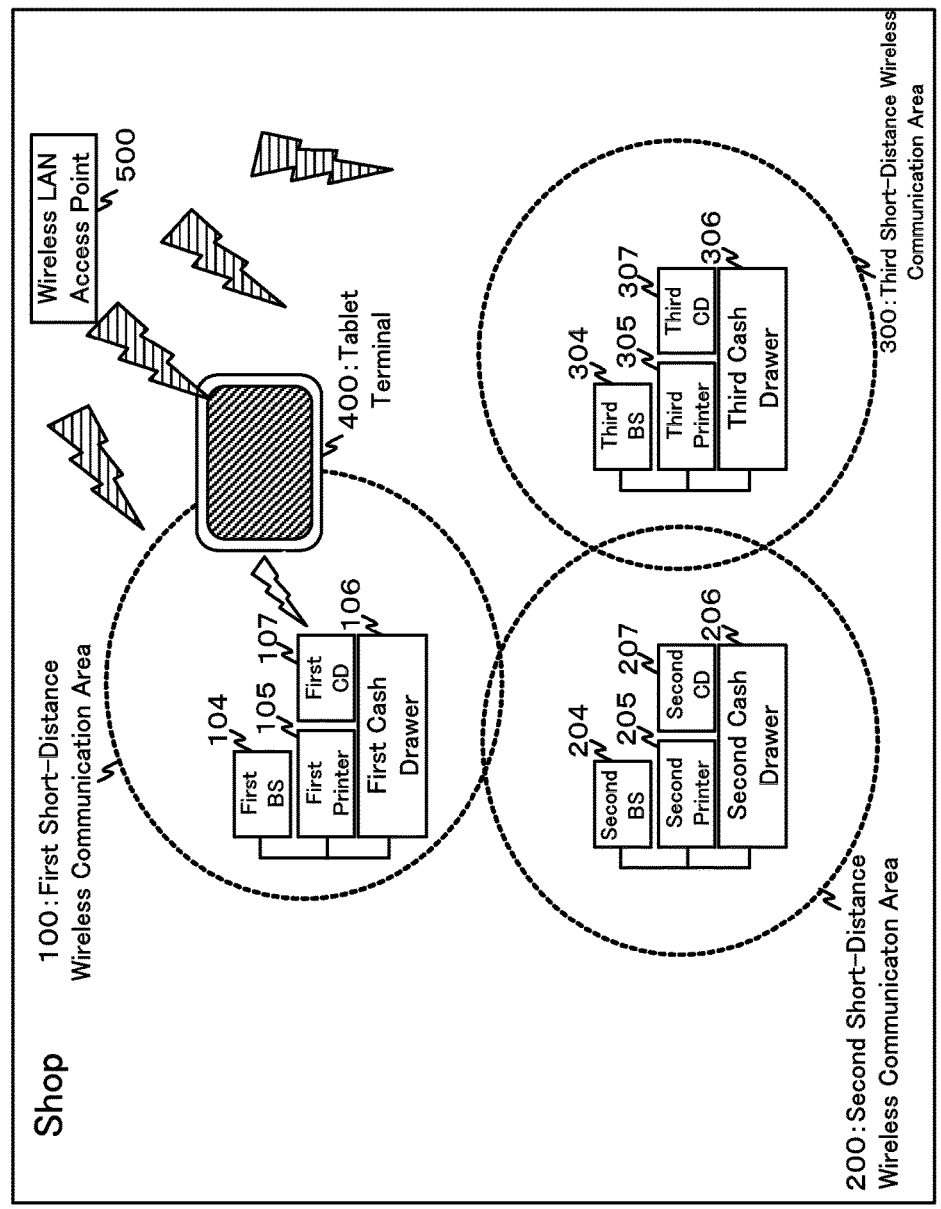
FIG. 7 A block diagram illustrates a basic configuration of whole of a second embodiment of the present invention.

Next, referring to FIG. 7, a second embodiment which is a variation of above embodiment is explained. Meanwhile, because the second embodiment is made by modifying a part of above embodiment, especially modifications are explained in detail while an explanation about overlapping portions is omitted.

FIG. 7 shows whole of a POS system which is the second embodiment. Referring to FIG. 7, the POS system being this embodiment includes a first barcode scanner 104, a first printer 105, a first cash drawer 106, a first communication device 107, a second barcode scanner 204, a second printer 205, a second cash drawer 206, a second communication device 207, a third barcode scanner 304, a third printer 305, a third cash drawer 306, a third communication device 307, a tablet terminal 400 and a wireless LAN access point 500. Meanwhile, in the figure, the barcode scanner is described as "BS". Further, in the figure, the communication device is described as "CD".

Although, in above first embodiment, the respective printer and the respective cash drawer are connected to LAN via wired LAN 600, this embodiment is modified in such a way that the respective printer and the respective cash drawer are connected to LAN via wireless LAN access point 500. Further, although, in the first embodiment, the barcode hand scanner is included in each one set of POS peripheral devices, this embodiment is modified in such a way that the barcode hand scanner is replaced with a fixed barcode scanner which is connected to LAN via a wireless LAN access point 500.

Further, in above first embodiment, the tablet terminal 400 performs short-distance wireless communication with one of devices (for example, a barcode hand scanner) performing processes at the installation location of the set.

However, in this embodiment, the tablet terminal performs short-distance wireless communication not with one of devices (for example, a barcode hand scanner) performing processes at the installation location of the set, but with a device installed at the installation location of the set separately from a device of the set and specifies the device of the set. Namely, a device dedicated to short-distance wireless communication with the tablet terminal 400 is provided. This device dedicated to short-distance wireless communication is a first communication device 107, a second communication device 207 and a third communication device 307. These respective communication devices merely perform communication for specifying a device in the set and do not participate in processes in the set. Therefore, the respective communication device does not perform processes for implementing a POS register.

Meanwhile, it is also possible to combine the first embodiment with the second embodiment. For example, a part of respective printers and respective cash drawers may perform communication via wired LAN while the other part may perform wireless LAN communication. Further, the barcode hand scanner according to the first embodiment and the communication device according to the second embodiment may be mixed. Namely, functional blocks similar to the short-distance wireless communicator 102-1 the specific information administrator 102-2 and the specific information storage 102-3 in FIG. 4 may be provided within one of devices included in the set or within a device installed separately from the devices of the set at the installation location of the set.

Next, a POS peripheral device registration information in the second embodiment is explained by referring to FIG. 8.

Referring to FIG. 8, similarly to the POS peripheral device registration information 701 in FIG. 3, POS peripheral device registration information 704 regarding three sets is illustrated.

In this example, it is supposed that functional blocks similar to the short-distance wireless communicator 102-1, the specific information administrator 102-2 and the specific information storage 102-3 are included within a respective communication device. Therefore, IP addresses are linked to a respective barcode scanner, a respective printer and a respective cash drawer which are POS peripheral devices included in the set. On the other hand, identification information is linked to a respective communication device.

Further, referring to FIG. 9, self-identification information 705 and set-identification information 706 are shown. These correspond respectively to the self-identification information 702 and the set-identification information 703 in FIG. 5. Of course, in this embodiment, because functional blocks similar to the short-distance wireless communicator 102-1, the specific information administrator 102-2 and the specific information storage 102-3 are included the respective communication device, the first communication device is linked to the identification information. Meanwhile, just like the self-identification information 702 and the set-identification information 703, it is enough that the specific information storage 102-3 stores not both but either of the self-identification information 705 and the set-identification information 706.

Further, in this embodiment, processes of Steps S11 to S18 are performed similarly to the first embodiment.

Specifically, the tablet terminal 400 communicates with the respective communication device, in place of the respective barcode hand scanner, via short-distance wireless communication, specifies a set in the POS peripheral device registration information 704 on the basis of the self-identification information 705 of the communication device, specifies IP addresses of the barcode scanner, the cash drawer and the printer, and communicates with the specified barcode scanner, cash drawer and printer (Step S11 to Step S18).

Just like the first embodiment, it is also possible not to specify a set on the basis of the identification information of the communication device but to give a set number to a set and specify the set on the basis of the set number sent from the communication device.

Above-described second embodiment brings an effect that it becomes possible to achieve the embodiment without replacing an existing POS peripheral device and so forth. This is because the embodiment can be achieved by adding the communication device newly.

Next, a third embodiment is explained by referring to FIG. 10. This embodiment is a variation of either of or a combination of the first embodiment and the second embodiment.

In above first embodiment and second embodiment, for example, by performing Steps S12 to S15 by use of either of the self-identification information 702 and the set-identification information 703 in FIG. 5 or either of the self-identification information 705 and the set-identification information 706, a set which includes a transmission source performing short-distance wireless communication is specified. Further, by comparing the specified set and the POS peripheral device registration information 701 or the POS peripheral device registration information 704, an IP address of the POS peripheral device such as a cash drawer is specified.

However, in this embodiment, these self-identification information 702, set-identification information 703, self-identification information 705 and set-identification information 706 are not utilized, but belonging device registration information 707 or belonging device registration information 708 shown in FIG. 10 are utilized. Therefore, the belonging device registration information 707 or the belonging device registration information 708 is stored in the specific information storage 102-3.

Then, to these belonging device registration information 707 and belonging device registration information 708, a respective IP addresses of respective POS peripheral devices of the set to which a respective barcode hand scanner itself and a respective communication device itself belong are linked. The belonging device registration information 707 is stored in the specific information storage of the barcode hand scanner in a case where short-distance wireless communication is performed with the barcode hand scanner just like the first embodiment. The belonging device registration information 708 is stored in the communication device in a case where short-distance wireless communication is performed with the communication device just like the second embodiment. Then, in Steps S12 to S14, these belonging device registration information 707 and belonging device registration information 708 are read out and transmitted, and the tablet terminal 400 receives these information. This makes it possible to specify IP addresses of respective POS peripheral devices without performing Step S15 (Step S16). Other processes are the same as each embodiment as noted above.

According to this embodiment as explained above, the tablet terminal 400 can receive an IP address itself, and therefore, the POS peripheral device registration information 701 and the POS peripheral device registration information 704 become unnecessary. Therefore, it is not necessary to install the POS peripheral device registration information storage 403.

Meanwhile, in each of embodiments as explained above, it is supposed that the tablet terminal 400 being a portable terminal is a tablet POS terminal which performs processes such as finalization and adjustment of a commodity purchased by a customer. However, the tablet terminal applicable to this embodiment needs not to be a tablet POS terminal and may be another portable processing terminal device other than a POS terminal.

Further, the POS peripheral device (apparatus) need not to be a barcode hand scanner, a cash drawer and a printer, and may be another device. The POS peripheral device (apparatus) may be a device necessary for processes which the portable processing terminal device performs at an installation location of the set to which the POS peripheral devices (apparatuses) belongs.

For example, it is also possible that this embodiment is achieved as an order entry system and used for a purpose that, when a slip is output from a handy terminal connected to wireless LAN to a kitchen printer connected to LAN communication, the slip is output to the closest kitchen printer.

Meanwhile, the device connection system according to these embodiments can be achieved by hardware, software, or combination thereof. Further, the device connection method executed by above-described device connection system can be achieved by hardware, software, or combination thereof. Here, the expression "achieved by software" means "achieved by a computer reading and executing a program".

A program may be stored using various types of a non-transitory computer readable medium and may be supplied to the computer. The non-transitory computer readable medium includes various types of a tangible storage medium. Examples of the non-transitory computer readable medium include a magnetic recording medium (e.g., flexible disk, magnetic tape, hard disk drive), a magnet-optical recording medium (e.g., magneto-optical disk), a CD-ROM (Read Only Memory), a CD-R, a CD-R/W, a semiconductor memory (e.g., mask ROM, a PROM (Programmable ROM), an EPROM (Erasable PROM), a flash ROM, and a RAM (random access memory)). Further, the program may be supplied to the computer by various types of a transitory computer readable medium as well. Examples of the transitory computer readable medium include an electric signal, an optical signal, and an electromagnetic wave. The transitory computer readable medium may supply the program to the computer via a wired channel such as an electric cable or an optical fiber, or via a wireless channel.

A part or entirety of the above-described embodiments may be described as in the following supplementary notes, but are not limited thereto.

(Supplementary Note 1)

A portable terminal used in a system in which a first device and a second device are handled as a set by being associated with each other and in which a plurality of such sets are disposed at locations distant from each other, wherein:

the portable terminal performs communication with one of the first devices in compliance with a first communication format that is a short-distance wireless communication format, so as to specify a set which includes said one of the first devices located closer to the portable terminal than other first devices, and performs communication with a second device included in the specified set in compliance with a second communication format.

(Supplementary Note 2)

The portable terminal according to Supplementary note 1, wherein the portable terminal registers communication information necessary for performing communication in compliance with the second communication format, the communication information differing respectively per the second devices and being linked to the respective sets including the second devices, and, in a case where the set is specified, by utilizing the communication information linked to the specified set, performs communication in compliance with the second communication format with the second device included in the specified set.

(Supplementary Note 3)

The portable terminal according to Supplementary note 1, wherein the portable terminal acquires communication information necessary for performing communication in compliance with the second communication format by performing communication in compliance with the first communication with said one of the first devices, the communication information differing respectively per the second devices, and, by utilizing the acquired communication information, performs communication in compliance with the second communication format with a second device included in the set including said one of the first devices.

(Supplementary Note 4)

The portable terminal according to any one of Supplementary notes 1 to 3, wherein the portable terminal compares communication conditions of the portable terminal with respective first devices being in a communicable condition and performs communication in compliance with the first communication format with the first device whose communication condition with the portable terminal is better than those of other first devices compared and which is determined as locating closer to the portable terminal, so as to specify the set.

(Supplementary Note 5)

The portable terminal according to any of Supplementary notes 1 to 3, wherein a longest communicable distance according to the first communication format between any one of the first devices and the portable terminal is shorter than a distance between locations at which the respective sets are located.

(Supplementary Note 6)

The portable terminal according to any of Supplementary notes 1 to 5, wherein both of the first device and the second device, or the second device in a set constitutes at least a part of POS, namely Point Of Sales, system, and the portable terminal communicates with such devices which constitute at least a part of the POS system included in the set including said one of the first devices so as to execute at least a part of functions of a POS terminal.

(Supplementary Note 7)

A device connection method performed by a portable terminal used in a system in which a first device and a second device are handled as a set by being associated with each other and in which a plurality of such sets are disposed at locations distant from each other, comprising:

performing communication with one of the first devices in compliance with a first communication format that is a short-distance wireless communication format, so as to specify a set which includes said one of the first devices located closer to the portable terminal than other first devices, and performing communication with a second device included in the specified set in compliance with a second communication format.

(Supplementary Note 8)

A device connection program for causing a computer to function as a portable terminal used in a system in which a first device and a second device are handled as a set by being associated with each other and in which a plurality of such sets are disposed at locations distant from each other, the program causing the computer to function as:

the portable terminal which performs communication with one of the first devices in compliance with a first communication format that is a short-distance wireless communication format, and so as to specify a set which includes said one of the first devices located closer to the portable terminal than other first devices, and performs communication with a second device included in the identified set in compliance with a second communication format.

(Supplementary Note 9)

A device connection system which comprises a first device, a second device and a portable terminal, in which the first device and the second device are handled as a set by being associated with each other and in which a plurality of such sets are disposed at locations distant from each other, wherein the portable terminal performs communication with one of the first devices in compliance with a first communication format that is a short-distance wireless communication format, so as to specify a set which includes said one of the first devices located closer to the portable terminal than other first devices, and performs communication with a second device included in the specified set in compliance with a second communication format, and the portable terminal, the first device and the second device, or the portable terminal and the second device are devices which execute functions of a POS, namely Point of Sales, system, and the portable terminal and the device which executes functions of the POS system included in one set communicate with each other, so as to execute at least a part of functions as the POS system.

(Supplementary Note 10)

A device connection method performed by a system which comprises a first device, a second device and a portable terminal, in which the first device and the second device are handled as a set by being associated with each other and in which a plurality of such sets are disposed at locations distant from each other, wherein the portable terminal performs communication with one of the first devices in compliance with a first communication format that is a short-distance wireless communication format, so as to specify a set which includes said one of the first devices located closer to the portable terminal than other first devices, and performs communication with a second device included in the specified set in compliance with a second communication format, and the portable terminal, the first device and the second device, or the portable terminal and the second device are devices which execute functions of a POS, namely Point of Sales, system, and the portable terminal and the device which executes functions of the POS system included in one set communicate with each other, so as to execute at least a part of functions as the POS system.

The present application claims priority to Japanese Patent Application No. 2013-050579 (filed on Mar. 13, 2013). The entire contents of Japanese Patent Application No. 2013-050579 are incorporated by reference into this specification.

INDUSTRIAL APPLICABILITY

The present invention is preferable for a supermarket, a convenience store, a department store, a restaurant, a hospital and so forth as a system where a portable terminal communicates with a POS peripheral device.

REFERENCE SIGNS LIST

100: First short-distance wireless communication area
101, 105: First printer
102: First barcode hand scanner
102-1: Short-distance wireless communicator
102-2: Specific information administrator
102-3: Specific information storage
102-4: Controller
103, 106: First cash drawer
104: First barcode scanner
107: First communication device
200: Second short-distance wireless communication area
201, 205: Second printer
202: Second barcode hand scanner
203, 206: Second cash drawer
204: Second barcode scanner
207: Second communication device
300: Third short-distance wireless communication area
301, 305: Third printer
302: Third barcode hand scanner
303, 306: Third cash drawer
304: Third barcode scanner
307: Third communication device
400: Tablet terminal
401: Short-distance wireless communicator
402: Wireless LAN communicator
403: POS peripheral device registration information storage
404: Controller
405: Operation receiver
406: Display
500: Wireless LAN access point
600: Wired LAN

What is claimed is:

1. A portable terminal used in a system in which a first device and a second device which is located close to the first device and is not connected to the first device electrically are handled as a set by being associated with each other and in which a plurality of such sets are disposed at locations distant from each other, the system including a storage configured to store information indicating a first device and a second device for each of the plurality of sets, the portable terminal comprising:

a first communicator configured to perform communication in compliance with a first communication format that is a short-distance wireless communication format, the first communicator communicating with the first devices and not communicating with the second devices; and a second communicator configured to perform communication with the second devices in compliance with a second communication format, wherein:

the portable terminal is configured to perform communication via the first communicator with one of the first devices so as to specify one of the sets whose information is stored in the storage, the one of the sets including said one of the first devices located closer to the portable terminal than other first devices, the portable terminal is configured to perform communication via the second communicator with a second device that is located close to the portable terminal and included in the specified set, and distances between each of the plurality of such sets are based on short-distance communication areas of each of the plurality of such sets.

2. The portable terminal according to claim 1, wherein the portable terminal is configured to register communication information necessary for performing communication in compliance with the second communication format, the communication information differing respectively per the second devices and being linked to the respective sets including the second devices, and, in a case where the set is specified, by utilizing the communication information linked to the specified set, perform communication in compliance with the second communication format with the second device included in the specified.

3. The portable terminal according to claim 1, wherein the portable terminal is configured to acquire communication information necessary for performing communication in compliance with the second communication format by performing communication in compliance with the first communication format with said one of the first devices, the communication information differing respectively per the second devices, and, by utilizing the acquired communication information, perform communication in compliance with the second communication format with a second device included in the set including said one of the first devices.

4. The portable terminal according to claim 1, wherein
the portable terminal is configured to compare communication conditions of the portable terminal with respective first devices being in a communicable condition and perform communication in compliance with the first communication format with the first device whose communication condition with the portable terminal is better than those of other first devices compared and which is determined as locating closer to the portable terminal, so as to specify the set.

5. The portable terminal according to claim 1, wherein
a longest communicable distance according to the first communication format between any one of the first devices and the portable terminal is shorter than a distance between locations at which the respective sets are located.

6. The portable terminal according to claim 1, wherein
both of the first device and the second device, or the second device in a set constitutes at least a part of POS, namely Point Of Sales, system, and the portable terminal is configured to communicate with such devices which constitute at least a part of the POS system included in the set including said one of the first devices so as to execute at least a part of functions of a POS terminal.

7. A device connection method performed by a portable terminal used in a system in which a first device and a second device which is located close to the first device and is not connected to the first device electrically are handled as a set by being associated with each other and in which a plurality of such sets are disposed at locations distant from each other, the system including a storage configured to store information indicating a first device and a second device for each of the plurality of sets, the portable terminal having a first communicator configured to perform communication in compliance with a first communication format that is a short-distance wireless communication format and a second communicator configured to perform communication with the second devices in compliance with a second communication format, the device connection method comprising:
performing communication via the first communicator with one of the first devices so as to specify one of the sets whose information is stored in the storage, the one of the sets including said one of the first devices located closer to the portable terminal than other first devices, and
performing communication via the second communicator with a second device that is located close to the portable terminal and included in the specified set,
wherein distances between each of the plurality of such sets are based on short-distance communication areas of each of the plurality of such sets.

8. A device connection program for causing a computer to function as a portable terminal used in a system in which a first device and a second device which is located close to the first device and is not connected to the first device electrically are handled as a set by being associated with each other and in which a plurality of such sets are disposed at locations distant from each other, the system including a storage configured to store information indicating a first device and a second device for each of the plurality of sets, the program causes:
the computer to function as a first communicator configured to perform communication in compliance with a first communication format that is a short-distance wireless communication format and a second communicator configured to perform communication with the second devices in compliance with a second communication format,
the first communicator to perform communication with one of the first devices so as to specify one of the sets whose information is stored in the storage, the one of the sets including said one of the first devices located closer to the portable terminal than other first devices, and
the second communicator to perform communication with a second device that is located close to the portable terminal and included in the identified set in compliance with the second communication format,
wherein distances between each of the plurality of such sets are based on short-distance communication areas of each of the plurality of such sets.

9. A device connection system which comprises a first device, a second device which is located close to the first device and is not connected to the first device electrically and a portable terminal, in which the first device and the second device are handled as a set by being associated with each other and in which a plurality of such sets are disposed at locations distant from each other, wherein
the system includes a storage configured to store information indicating a first device and a second device for each of the plurality of sets,
the portable terminal comprises: a first communicator configured to perform communication in compliance with a first communication format that is a short-distance wireless communication format, the first communicator communicating with the first devices and not communicating with the second device; and a second communicator configured to perform communication with the second devices in compliance with a second communication format,
the first communicator is configured to perform communication with one of the first devices so as to specify one of the sets whose information is stored in the storage, the one of the sets including said one of the first devices located closer to the portable terminal than other first devices, and the second communicator is configured to perform communication with a second device that is located close to the portable terminal and included in the specified set in compliance with the second communication format, and
the portable terminal, the first device and the second device, or the portable terminal and the second device are devices which execute functions of a Point of Sales (POS) system, and the portable terminal and the device which executes functions of the POS system included in one set communicate with each other, so as to execute at least a part of functions as the POS system,
wherein distances between each of the plurality of such sets are based on short-distance communication areas of each of the plurality of such sets.

10. A device connection method performed by a system which comprises a first device, a second device which is located close to the first device and is not connected to the first device electrically and a portable terminal, in which the first device and the second device are handled as a set by being associated with each other and in which a plurality of such sets are disposed at locations distant from each other, the system including a storage configured to store information indicating a first device and a second device for each of the plurality of sets, wherein
the portable terminal comprises a first communicator configured to perform communication in compliance with a first communication format that is a short-distance wireless communication format; and a second communicator configured to perform communication with the second devices in compliance with a second communication format the device connection method comprising: performing communication via the first communicator with one of the first devices so as to specify one of the sets whose information is stored in the storage, the one of the sets including said one of the first devices located closer to the portable terminal than other first devices, and performing communication via the second communicator with a second device that is located close to the portable terminal and included in the specified set, and the portable terminal, the first device and the second device, or the portable terminal and the second device are devices which execute functions of a Point of Sales (POS) system, and the portable terminal and the device which executes functions of the POS system included in one set communicate with each other, so as to execute at least a part of functions as the POS system, wherein distances between each of the plurality of such sets are based on short-distance communication areas of each of the plurality of such sets.

11. The portable terminal according to claim 1, wherein a first communication range corresponds to an area in which the first communicator of the first device of the specified set is able to communicate based on the first communication format, and wherein the second device of the specified set is located within the first communication range.

* * * * *